US011546836B2

(12) United States Patent
Martin et al.

(10) Patent No.: US 11,546,836 B2
(45) Date of Patent: *Jan. 3, 2023

(54) TELECOMMUNICATIONS APPARATUS AND METHODS

(71) Applicant: SONY CORPORATION, Tokyo (JP)

(72) Inventors: Brian Alexander Martin, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 16/939,486

(22) Filed: Jul. 27, 2020

(65) Prior Publication Data

US 2020/0359301 A1 Nov. 12, 2020

Related U.S. Application Data

(63) Continuation of application No. 16/362,712, filed on Mar. 25, 2019, now Pat. No. 10,728,834, which is a
(Continued)

(30) Foreign Application Priority Data

Nov. 6, 2015 (EP) .................................. 15193497

(51) Int. Cl.
*H04W 48/10* (2009.01)
*H04W 48/12* (2009.01)
(Continued)

(52) U.S. Cl.
CPC ............. *H04W 48/10* (2013.01); *H04B 1/38* (2013.01); *H04W 16/26* (2013.01); *H04W 48/12* (2013.01);
(Continued)

(58) Field of Classification Search
None
See application file for complete search history.

(56) References Cited

U.S. PATENT DOCUMENTS 6,628,946 B1 * 9/2003 Wiberg ................. H04W 48/12
455/434
7,996,010 B2 * 8/2011 Farnsworth ........... H04W 36/12
455/437
(Continued)

FOREIGN PATENT DOCUMENTS

CN 1371576 A 9/2002
CN 101669385 A 3/2010
(Continued)

OTHER PUBLICATIONS

Office Action dated Jun. 23, 2020, in corresponding Chinese patent Application No. 201680056354.5, 24 pages.
(Continued)

*Primary Examiner* — Michael J Moore, Jr.
*Assistant Examiner* — Gautam Sharma
(74) *Attorney, Agent, or Firm* — Xsensus LLP

(57) ABSTRACT

A terminal device for use in a wireless telecommunications system comprises a transceiver to perform wireless communication with a base station and to obtain system information defining communication parameters from system information data received from that base station; system information storage; and a controller to detect whether the system information storage already holds at least some of the system information applicable to a newly communicating base station and to control the transceiver to obtain any portions of the system information not already held by the terminal device, in which: the system information comprises a plurality of system information blocks; and the controller is configured to detect parts of a system information block stored by the system information storage which are appli-
(Continued)

cable to the newly communicating base station and to obtain other parts of that system information block as a partial system information block from the newly communicating base station.

15 Claims, 10 Drawing Sheets

Related U.S. Application Data continuation of application No. 15/615,522, filed on Jun. 6, 2017, now Pat. No. 10,271,266, which is a continuation of application No. PCT/EP2016/072200, filed on Sep. 19, 2016.

(51) Int. Cl.
*H04W 76/11* (2018.01)
*H04B 1/38* (2015.01)
*H04W 16/26* (2009.01)
*H04W 48/16* (2009.01)
*H04W 4/70* (2018.01)

(52) U.S. Cl.
CPC .............. *H04W 76/11* (2018.02); *H04W 4/70* (2018.02); *H04W 48/16* (2013.01)

(56) References Cited

U.S. PATENT DOCUMENTS

| | | | | |
|---|---|---|---|---|
| 8,412,211 | B2* | 4/2013 | Petrovic | H04W 72/042 455/452.2 |
| 8,548,507 | B2* | 10/2013 | Ko | H04W 48/12 455/435.2 |
| 9,226,194 | B2* | 12/2015 | Choi | H04W 28/06 |
| 2008/0125043 | A1 | 5/2008 | Karmanenko | |
| 2008/0253332 | A1* | 10/2008 | Ore | H04J 11/0069 370/331 |
| 2011/0292893 | A1* | 12/2011 | Lee | H04W 4/50 370/329 |
| 2012/0163235 | A1* | 6/2012 | Ho | H04W 52/383 370/254 |
| 2013/0064138 | A1* | 3/2013 | Hakola | H04W 76/14 370/255 |
| 2013/0301524 | A1* | 11/2013 | Xu | H04W 28/06 370/328 |
| 2013/0322320 | A1 | 12/2013 | Lee | |
| 2014/0094212 | A1* | 4/2014 | Ahn | H04W 4/70 455/517 |
| 2014/0133381 | A1* | 5/2014 | Zhu | H04W 48/16 370/312 |

FOREIGN PATENT DOCUMENTS

| | | |
|---|---|---|
| EP | 1190582 A1 | 3/2002 |
| EP | 1686826 A | 8/2006 |
| EP | 2 493 223 A1 | 8/2012 |
| JP | 2003-500950 A | 1/2003 |
| JP | 2010-213143 A | 9/2010 |
| RU | 2320086 C2 | 3/2008 |
| RU | 2011102450 A | 7/2012 |
| WO | 00/72609 A1 | 11/2000 |
| WO | 01/52589 A1 | 7/2001 |
| WO | 2008/114137 A2 | 9/2008 |
| WO | 2014/171868 A | 10/2014 |
| WO | WO-2015013858 A1 | 2/2015 |

OTHER PUBLICATIONS

Sony: "System Information Area Scope and Value Tag", 3GPP Draft; R2-161140—NBIOT SIB, 3rd Generation Partnership Project (3GPP), Mobile Competence Centre ; 650, Route Des Lucioles ; F-06921 Sophia-Antipolis Cedex ; France, vol. RAN WG2, No. St. Julian's, Malta; Feb. 15, 2016-Feb. 19, 2016 Feb. 14, 2016 (Feb. 14, 2016), XP051055124, Retrieved from the Internet: URL:http://www.3gpp.org/ftp/Meetings_3GPP_SYNC/RAN2/Docs/ [retrieved on Feb. 14, 2016].

Office Action dated Jun. 23, 2020 in Japanese Patent Application No. 2018-522934, 7 pages.

International Search Report and Written Opinion dated Feb. 14, 2017 in PCT/EP2016/072200.

"SIB for Rel-13 low complexity and coverage enhanced UEs", Ericsson, 3GPP TSG-RAN WG2 #89bis Bratislava, Slovakia, Apr. 20-24, 2015, Tdoc R2-151553, XP050936468, 1-8 Pages.

"New SI proposal: Feasibility Study on LTE-based V2X Services", LG Electronics, CATT, Vodafone, Huawei, 3GPP TSG RAN Meeting # 68 Malmö, Sweden, Jun. 15-18, 2015, RP-151109, 7 Pages.

"New Work Item: NarrowBand IOT (NB-IOT)", Qualcomm Incorporated, 3GPP TSG RAN Meeting #69 Phoenix, USA, Sep. 14-16, 2015, RP-151621, 8 Pages.

Digital cellular telecommunications system (Phase 2+); Universal Mobile Telecommunications System (UMTS); LTE; Service requirements for Machine-Type Communications (MTG); Stage 1 (3GPP TS 22.368 version 11.6.0 Release 11), ETSI TS 122 368 V11.6.0 (Sep. 2012), 1-20 Pages and Cover Page.

Russian Office Action dated Feb. 20, 2020 in Russian Application No. 2018120731/08.

Shiwei Cao et al., "Joint handover decision to relieve ping-pong effect in V2X communication", International Conference on Connected Vehicles and Expo (ICCVE). Shenzhen, China, Oct. 19, 2015.

\* cited by examiner

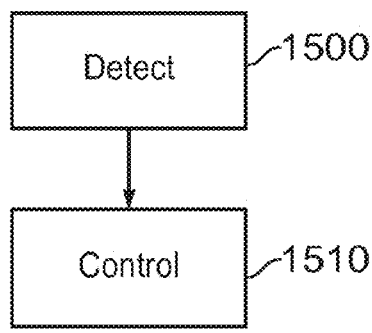
FIG. 15
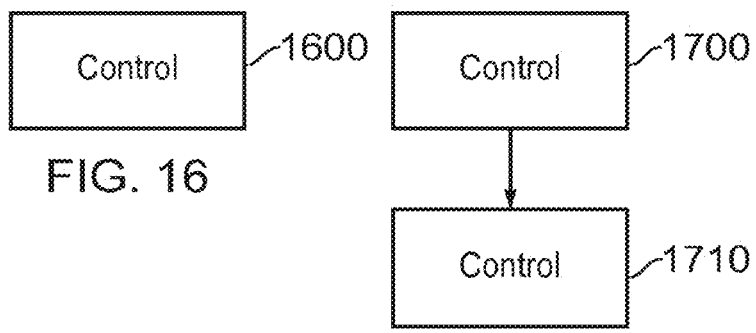
FIG. 16
FIG. 17
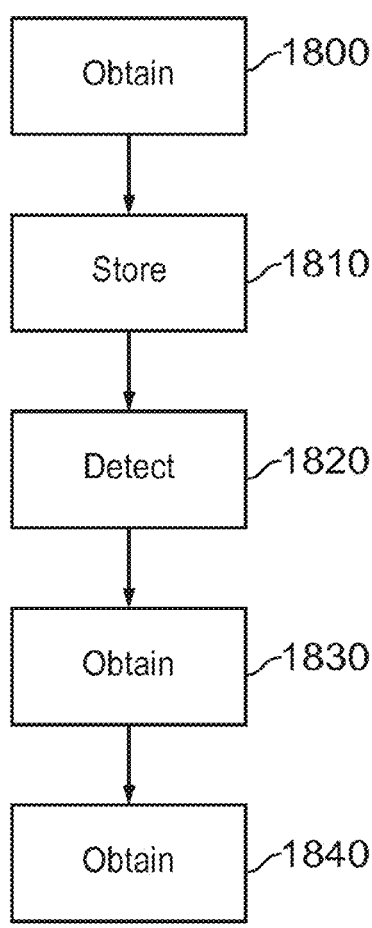
FIG. 18
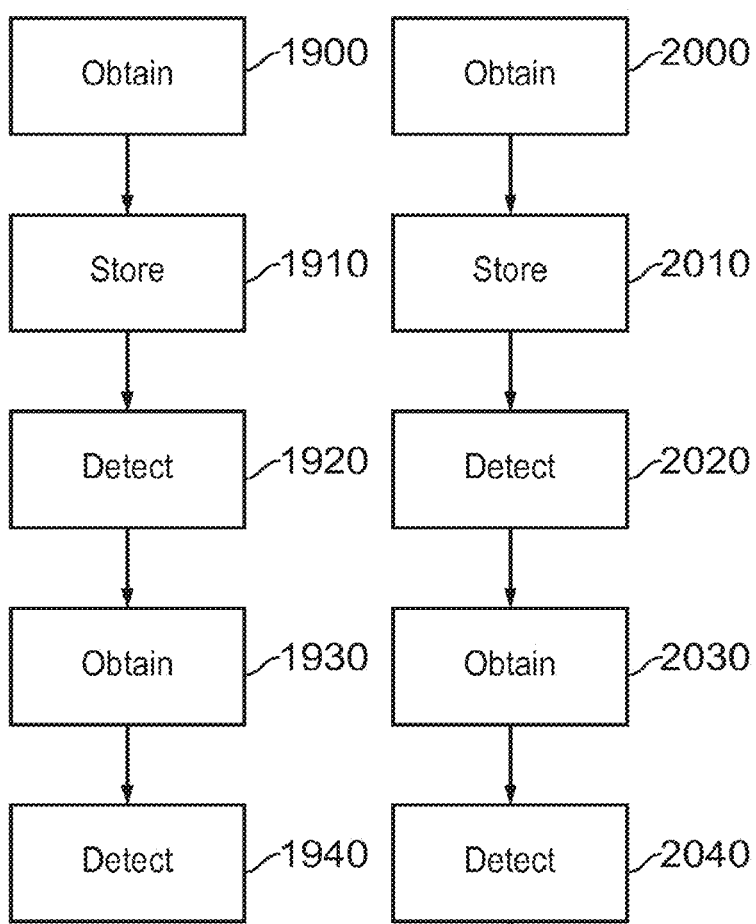
FIG. 19
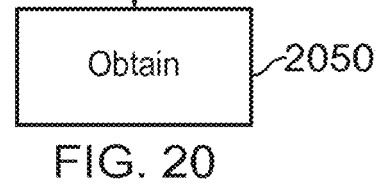
FIG. 20

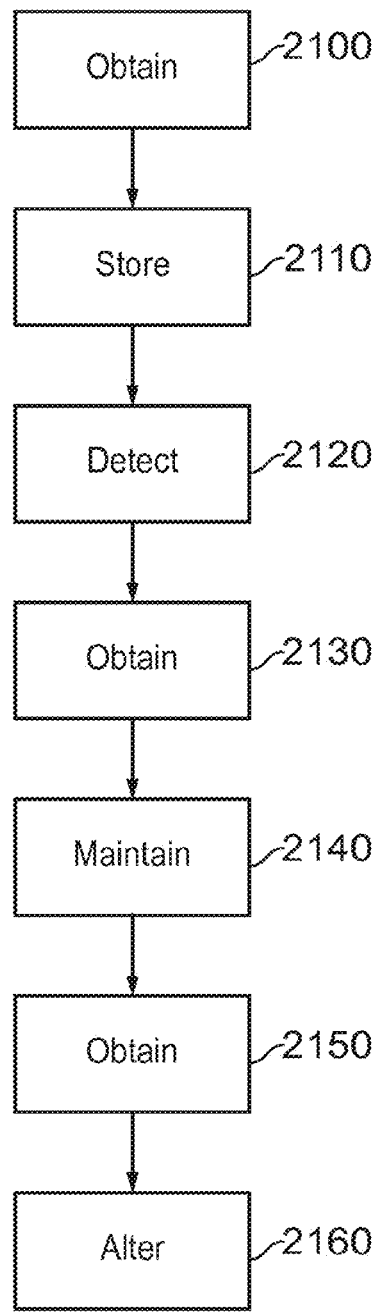
FIG. 21
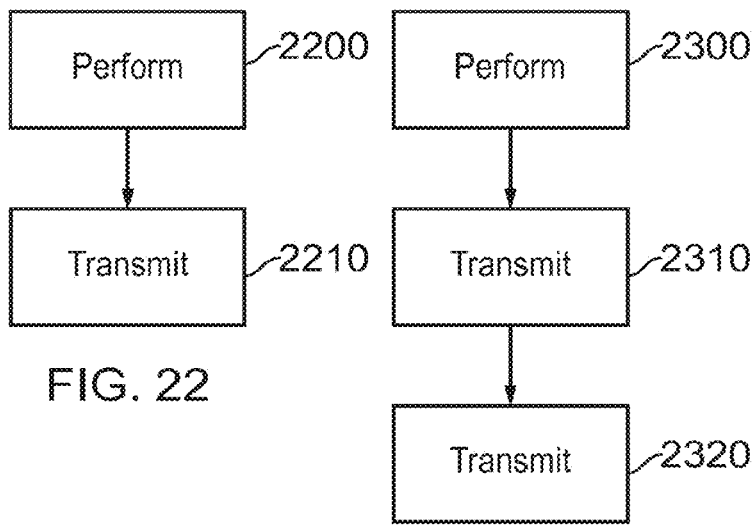
FIG. 22
FIG. 23
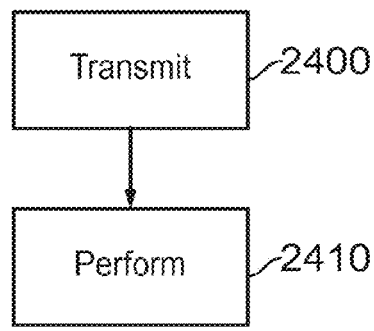
FIG. 24

TELECOMMUNICATIONS APPARATUS AND METHODS

CROSS REFERENCE TO RELATED APPLICATIONS

This application is a continuation of Ser. No. 16/362,712, filed Mar. 25, 2019, which is a continuation of U.S. application Ser. No. 15/615,522, filed Jun. 6, 2017, which is a continuation of International Application No. PCT/EP2016/072200, filed Sep. 19, 2016, which claims priority to European patent application 15193497.3, filed Nov. 6, 2015, the contents of each are herein incorporated by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The present disclosure relates to wireless telecommunications systems and methods.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architectures, are able to support a more sophisticated range of services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, some of which are in some respects typified by semi-autonomous or autonomous wireless communication devices (MTC devices) communicating small amounts of data on a relatively infrequent basis, Examples include so-called smart meters which, for example, are located in a customer's home and periodically transmit data back to a central MTC server relating to the customer's consumption of a utility such as gas, water, electricity and so on. Smart metering is merely one example of potential MTC device applications. Other examples include vehicle communications systems (for example, vehicle-to-vehicle ("V2V"), vehicle-to-pedestrian ("V2P") or vehicle-to-infrastructure/network ("V2I/N") systems, referred to generically as "V2X" arrangements. Further information on characteristics of MTC-type devices can be found, for example, in the corresponding standards, such as ETSI TS 122 368 V11.6.0 (2012-09)/3GPP TS 22.368 version 11.6.0 Release 11).

In MTC arrangements, including V2X systems, technical issues can arise in the provision (by a base station) or acquisition (by a terminal device) of so-called system information. In broad summary, system information, or at least some aspects of system information, in existing wireless telecommunications systems, such as LTE-based telecommunications systems, is transmitted as System Information Blocks (SIBs). Receipt of the SIBs is required in order for a terminal device to be able to communicate with a cell, for reduced capability devices such as MTC devices, these SIBs can be large in comparison to the data handling capabilities of the device. This can also be an issue in the context of vehicle-based devices, where the movement of the vehicle (and the potential small size of cells defined, for example, by road-side units (RSUs) means that the time spent by a terminal device in a particular cell may be short. Similarly, in the context of coverage enhancement, it is sometimes difficult for a terminal device (whether reduced capability or not) to receive large SIBs. There is therefore a need for schemes which allow system information to be communicated to terminal devices operating on restricted frequency resources in wireless telecommunications systems. There is also a need for schemes which allow system information to be communicated to terminal devices operating in a coverage enhancement situation.

It is a constant aim to improve the operation and efficiency of wireless network systems.

SUMMARY

The present disclosure can address or mitigates the problems discussed above.

Respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 15 is a summary flowchart of operations of a terminal device;

FIGS. 16 and 17 are summary flowcharts of operations of a base station;

FIGS. 18 to 21 are summary flowcharts illustrating operations of a terminal device; and FIGS. 22 to 24 are summary flowcharts illustrating operations of a base station.

DETAILED DESCRIPTION OF THE EMBODIMENTS

Figure 1:
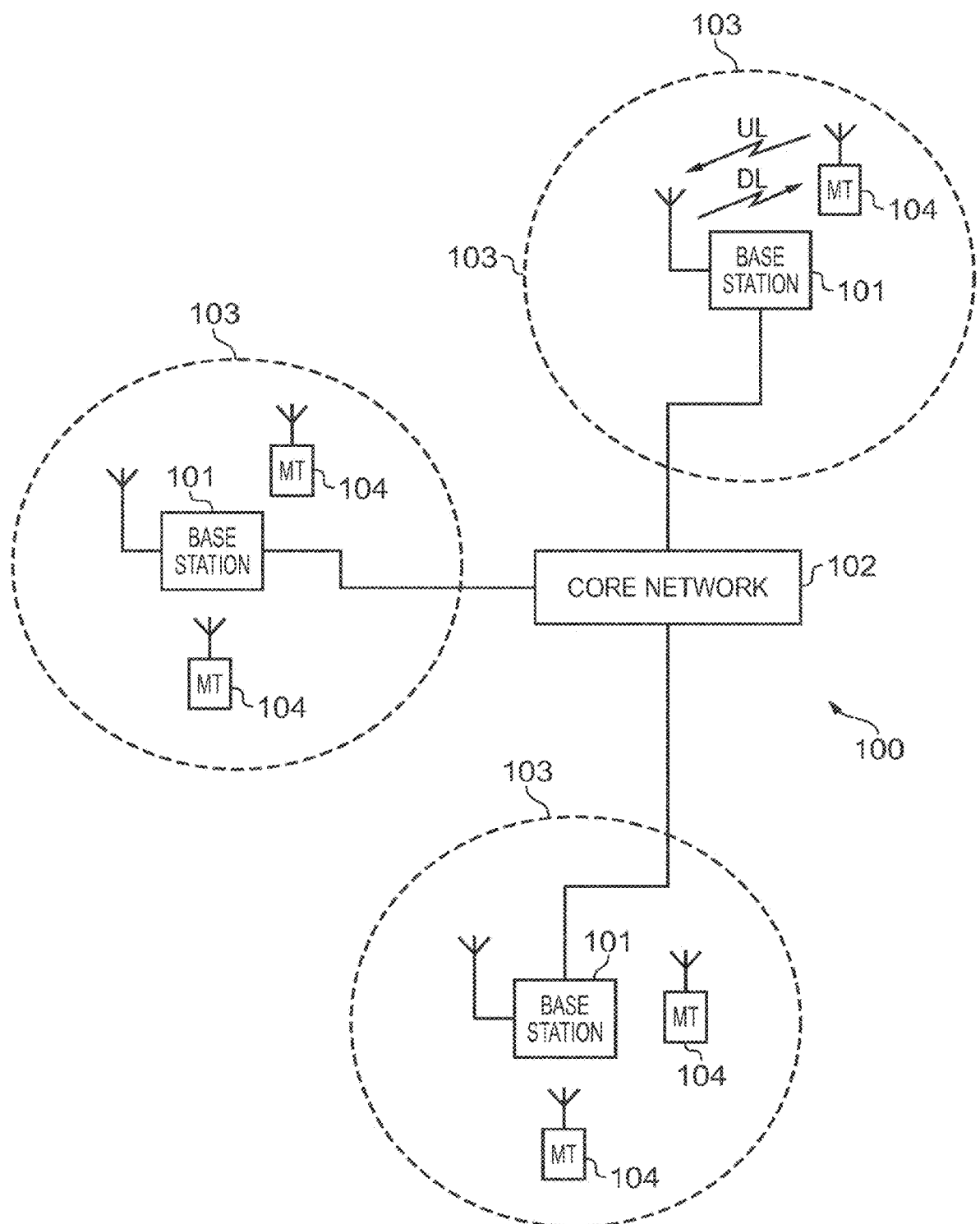
FIG. 1 schematically represents an example of a LTE-type wireless telecommunication network.

FIG. 1 provides a schematic diagram illustrating some basic functionality of a wireless telecommunications network/system 100 operating in accordance with LTE principles. Various elements of FIG. 1 and their respective modes of operation are well-known and defined in the relevant standards administered by the 3GPP (RTM) body.

The network 100 includes a plurality of base stations 101 connected to a core network 102, Each base station provides a coverage area 103 (for example, a cell) within which data can be communicated to and from terminal devices 104. Data are transmitted from base stations 101 to terminal devices 104 within their respective coverage areas 103 via a radio downlink. Data are transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth, Base stations may also be referred to as transceiver stations/nodeBs/e-NodeBs, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and a single carrier frequency division multiplex based interface for the radio uplink (so-called SC-FDMA).

Figure 2:
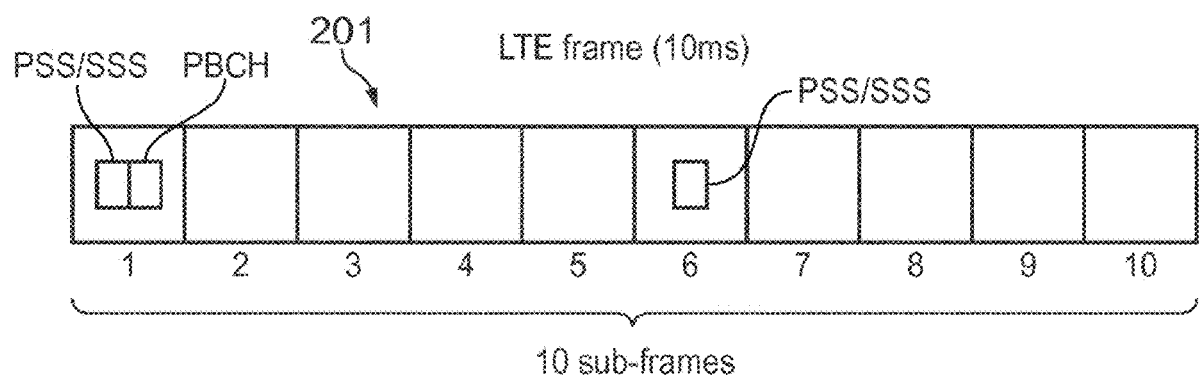
FIG. 2 schematically represents some aspects of a LTE downlink radio frame structure.

FIG. 2 shows a schematic diagram illustrating an OFDM based LTE downlink radio frame 201. The LTE downlink radio frame is transmitted from an LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
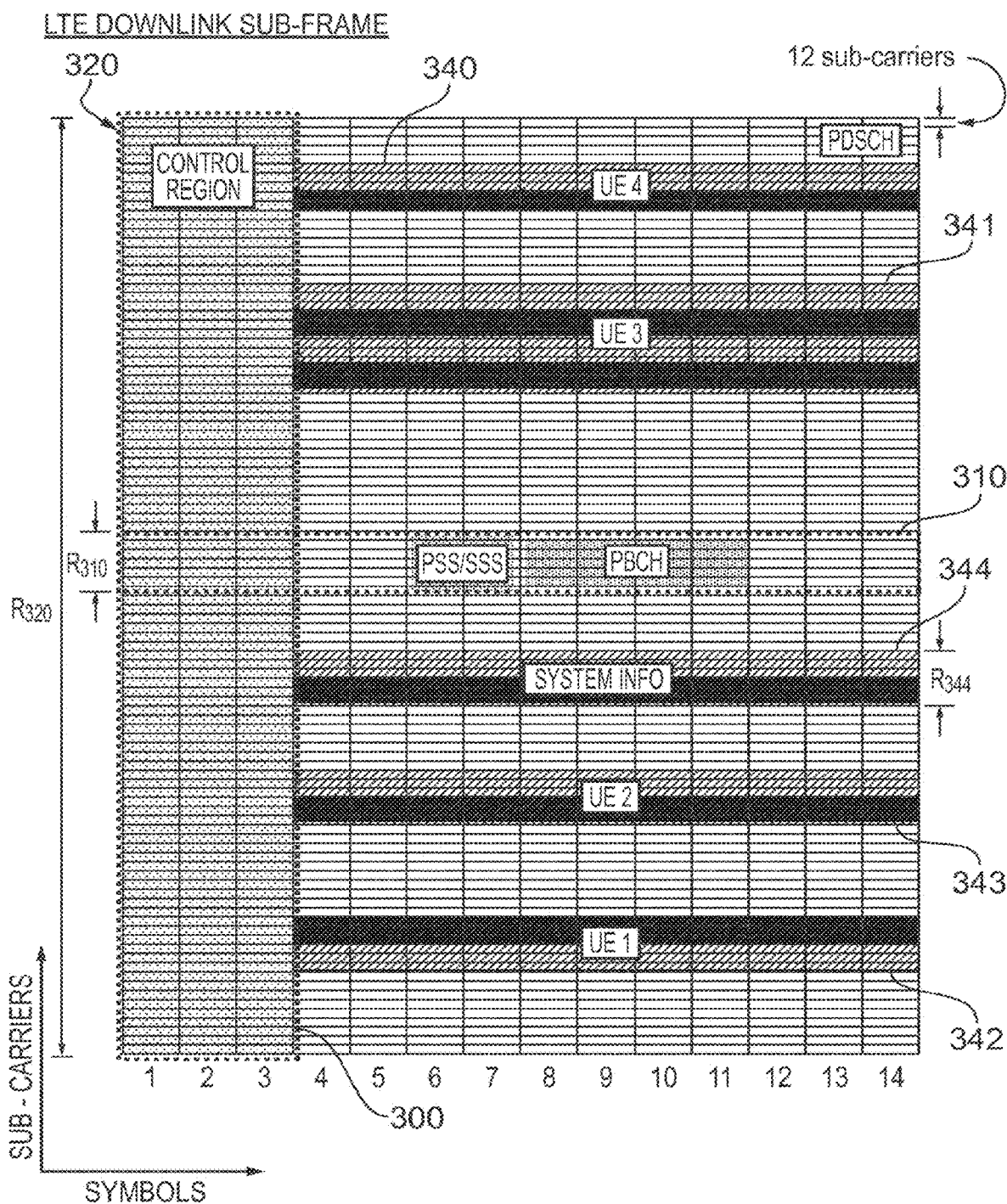
FIG. 3 schematically represents some aspects of a LTE downlink radio subframe structure.

FIG. 3 is a schematic diagram of a grid which illustrates the structure of an example conventional downlink LTE subframe (corresponding in this example to the first, i.e. left-most, subframe in the frame of FIG. 2). The subframe comprises a predetermined number of symbols which are transmitted over a 1 ms period. Each symbol comprises a predetermined number of orthogonal sub-carriers distributed across the bandwidth of the downlink radio carrier.

The example subframe shown in FIG. 3 comprises 14 symbols and 1200 sub-carriers spread across a 20 MHz bandwidth. The smallest allocation of user data for transmission in LTE is a resource block comprising twelve sub-carriers transmitted over one slot (0.5 subframe). For clarity, in FIG. 3, each individual resource element (a resource element comprises a single symbol on a single subcarrier) is not shown, instead each individual box in the subframe grid corresponds to twelve sub-carriers transmitted on one symbol.

FIG. 3 shows resource allocations for four LTE terminals 340, 341, 342, 343. For example, the resource allocation 342 for a first LTE terminal (UE 1) extends over five blocks of twelve sub-carriers (60 sub-carriers), the resource allocation 343 for a second LTE terminal (UE2) extends over six blocks of twelve sub-carriers and so on.

Control channel data are transmitted in a control region 300 (indicated by dotted-shading in FIG. 3) of the subframe comprising the first n symbols of the subframe where n can vary between one and three symbols for channel bandwidths of 3 MHz or greater and where n can vary between two and four symbols for channel bandwidths of 1.4 MHz. For the sake of providing a concrete example, the following description relates to carriers with a channel bandwidth of 3 MHz or greater so the maximum value of n will be 3. The data transmitted in the control region 300 includes data transmitted on the physical downlink control channel (PDCCH), the physical control format indicator channel (PCFICH) and the physical HARQ indicator channel (PHICH).

PDCCH contains control data indicating which sub-carriers on which symbols of the subframe have been allocated to specific LTE terminals. Thus, the PDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 sub-carriers wide (corresponding to a transmission bandwidth of 1.08 MHz). The PSS and SSS are synchronisation signals that once detected allow an LTE terminal device to achieve frame synchronisation and determine the cell identity of the enhanced Node B transmitting the downlink signal. The PBCH carries information about the cell, comprising a master information block (MIB) that includes parameters that LTE terminals use to properly access the cell. Data transmitted to individual LTE terminals on the physical downlink shared channel (PDSCH) can be transmitted in other resource elements of the subframe.

FIG. 3 also shows a region of PDSCH containing system information and extending over a bandwidth of R344.

An LTE frame also includes reference signals which are not shown in FIG. 3 in the interests of clarity.

Figure 4:
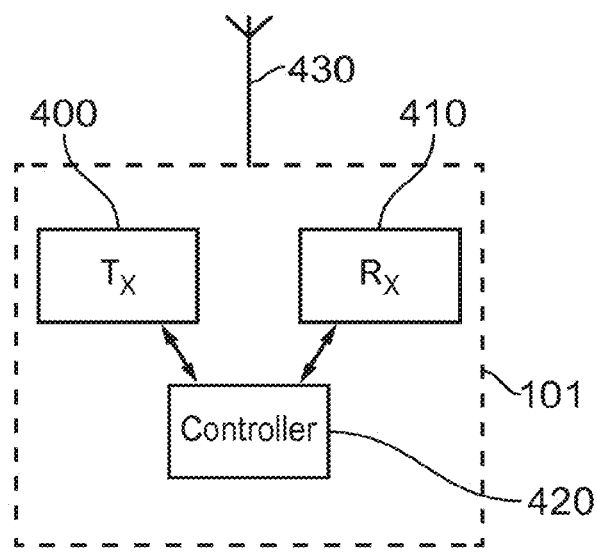
FIG. 4 schematically illustrates a base station.

FIG. 4 schematically illustrates a base station 101 in more detail. The base station 101 includes a transmitter (Tx) 400 for transmitting signals via a wireless access interface (and via an antenna 430) to the one or more communications devices or UEs, and a receiver (Rx) 410 to receive signals from the one or more terminal devices within the coverage area of the base station. A controller 420 controls the transmitter 400 and the receiver 410 to transmit and receive the signals via the wireless access interface. The transmitter 400 and receiver 410 together form a transceiver. The controller 420 may perform a function of controlling the allocation of communications resource elements of the wireless access interface and may in some examples include a scheduler for scheduling transmissions via the wireless access interface for both an uplink and the downlink. Operations of a base station discussed in connection with the description below may be undertaken or overseen, at least in part, by the controller 420, FIG. 4 therefore provides an example of a base station for use in a wireless telecommunications system, the base station comprising a transceiver 400, 410 configured to perform wireless communication with a terminal device; and a controller 420 configured to control the transceiver.

In examples, the arrangement of FIG. 4 provides a base station for use in a wireless telecommunications system, the base station comprising: a transceiver (such as 400, 410) to perform wireless communication with a terminal device; and a controller (such as 420) to control the transceiver to transmit system information defining communication parameters and (as discussed below, for example as the area ID) identification data indicating a group of two or more base stations having at least part of the system information in common.

In other examples, it is not necessary for each base station to transmit the system information (or all of the system information). Instead, a base station can transmit a reference to system information which the terminal device may already hold, such as system information corresponding to a neighbouring base station (so that there is at least a good chance, especially in a system of small cells such as an array of road side units, that the terminal device will have already downloaded the system information or—if not—that the terminal device will soon move into a cell corresponding to a base station which is transmitting the full system information). The reference could be, for example, an area ID (see below) which is the same as the area ID of the neighbouring cell. Or the reference could be an indicator code, for example formed of a preamble to show that it is an indicator code, followed by a data item indicating a selection, amongst a set of possible sets or instances of system information, which one should be used in connection with that base station. Or the reference could be a simple code saying "re-use (some or all of) whatever system information you currently hold" on the basis that the terminal device's most recent interaction will have been with a geographically adjacent cell. Operating under arrangements such as these, the base station of FIG. 4 provides an example of a base station for use in a wireless telecommunications system, the base station comprising: a transceiver to perform wireless communication with a terminal device; and a controller to control the transceiver to transmit reference data referencing a set of system information defining communication parameters of that base station; the controller being configured to control the transceiver to conduct wireless communication in accordance with the referenced system information.

FIG. 4, when operating in accordance with the principles and details set out below, provides an example of a base station for use in a wireless telecommunications system, the base station comprising: a transceiver to perform wireless communication with a terminal device; and a controller to control the transceiver to transmit system information defining communication parameters and identification data indicating a group of two or more base stations having at least part of the system information in common; in which: the system information comprises a plurality of system information blocks; the controller is configured to control the transceiver to transmit (i) a complete instance of a system information block; and (ii) a partial instance of the system information block containing difference information with respect to an instance of system information applicable to another base station.

FIG. 4, when operating in accordance with the principles and details set out below, provides an example of a base station for use in a wireless telecommunications system, the base station comprising: a transceiver to perform wireless communication with a terminal device; and a controller to control the transceiver to transmit system information defining communication parameters; in which: the system information comprises a plurality of system information blocks; the controller is configured to control the transceiver to transmit a timer reset message to instruct a terminal device to increase a remaining portion of a validity period maintained by that base station for system information held by that base station.

FIG. 4, when operating in accordance with the principles and details set out below, provides an example of a base station for use in a wireless telecommunications system, the base station comprising: a transceiver to perform wireless communication with a terminal device; and a controller to control the transceiver to transmit reference data referencing a set of system information defining communication parameters of that base station; the controller being configured to control the transceiver to conduct wireless communication in accordance with the referenced system information.

Figure 5:
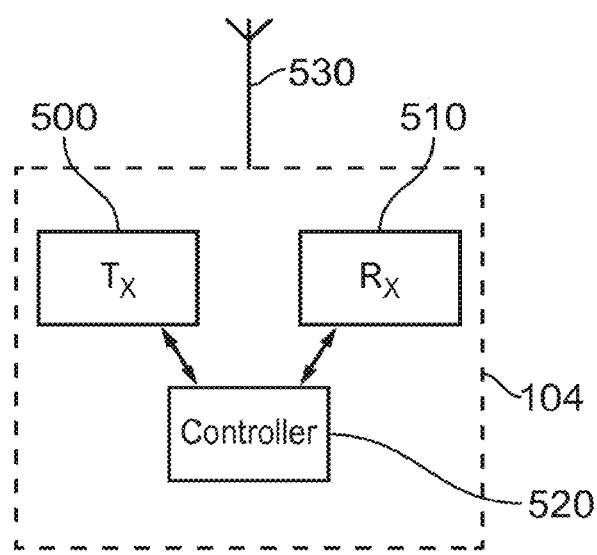
FIG. 5 schematically illustrates a terminal device.

FIG. 5 schematically illustrates a terminal device 104 in more detail. The terminal device 104 includes a transmitter 500 associated with an antenna 530 for transmitting signals on the uplink of the wireless access interface to the base station 101 and a receiver 510 for receiving signals transmitted by the base station 101 on the downlink via the wireless access interface. The transmitter 500 and the receiver 510 are controlled by a controller 520. The transmitter 500 and receiver 510 together form a transceiver, Operations of a terminal device discussed in connection with the description below may be undertaken or overseen, at least in part, by the controller 520. In some example embodiments of the present disclosure, the terminal device 104 is a so-called Low Complexity Machine Type Communication (LC-MTC) terminal device or narrowband internet-of-things (NB-IOT) device. NB-10T devices are used to connect various electronic and other items to a network such as the internet, They are often characterised by low cost manufacture and deployment, low complexity, low power consumption and the like. An example of such device is smart electricity meter. Typical NB-10T provision is expected to occupy a low bandwidth, such as only 180 kHz of bandwidth. FIG. 5 therefore provides an example of a terminal device for use in a wireless telecommunications system, the terminal device comprising: a transceiver 500, 510 configured to perform wireless communication with a base station; and a controller 520 configured to control the transceiver.

The base station and the terminal device, as just described, can be implemented, at least in part, by computer software which, when executed by a computer (such as a processor device acting as the controller in each case), causes the computer to perform the described methods of operation. Such computer software may be provided by a non-transitory machine readable storage medium storing the computer software.

The base station of FIG. 4 and the terminal device of FIG. 5, in the context of an arrangement such as that shown in FIG. 1, provide an example of a telecommunications system comprising one or more such terminal devices and one or more such base stations.

FIG. 5, when operating in accordance with the principles and details set out below, provides an example of a terminal device for use in a wireless telecommunications system, the terminal device comprising: a transceiver to perform wireless communication with a base station and to obtain system information defining communication parameters from system information data received from that base station; system information storage; and a controller to detect whether the system information storage already holds at least some of the system information applicable to a newly communicating base station and to control the transceiver to obtain any portions of the system information not already held by the terminal device, in which: the system information comprises a plurality of system information blocks; and the controller is configured to detect parts of a system information block stored by the system information storage which are applicable to the newly communicating base station and to obtain other parts of that system information block as a partial system information block from the newly communicating base station.

FIG. 5, when operating in accordance with the principles and details set out below, provides an example of a terminal device for use in a wireless telecommunications system, the terminal device comprising: a transceiver to perform wireless communication with a base station and to obtain system information defining communication parameters from system information data comprising a plurality of information blocks; system information storage; and a controller to detect whether the system information storage already holds at least some of the system information applicable to the newly communicating base station and to control the transceiver to obtain any portions of the system information from the newly communicating base station which are not already held by the terminal device; in which the controller is configured to detect whether identification data associated with information blocks transmitted by the newly communicating base station corresponds to identification data associated with information blocks stored by the system information storage; in which the identification data comprises area information identifying a group of base stations and a value tag identifying a version of one or more of the information blocks.

FIG. 5, when operating in accordance with the principles and details set out below, provides an example of a terminal device for use in a wireless telecommunications system, the terminal device comprising: a transceiver to perform wireless communication with a base station and to obtain system information defining communication parameters from system information data transmitted by that base station; system information storage configured to store the system information and one or more associated value tags identifying a version of respective portions of the system information; and a controller to detect whether the system information storage already holds at least some of the system information applicable to the newly communicating base station and to control the transceiver to obtain any portions of the system information not already held by the terminal device from the base station; the controller being configured to detect an instruction to obtain updated system information and, in response to detection of the instruction, to obtain from the base station an updated version of only those portions of the system information having a value tag indicating a version of those portions different to the corresponding value tag held by the system information storage.

FIG. 5, when operating in accordance with the principles and details set out below, provides an example of a terminal device for use in a wireless telecommunications system, the terminal device comprising: a transceiver to perform wireless communication with a base station and to obtain system information defining communication parameters from system information data transmitted by that base station; system information storage; and a controller to detect whether the system information storage already holds at least some of the system information applicable to the newly communicating base station and to control the transceiver to obtain any portions of the system information not already held by the terminal device from the base station; the controller being configured to maintain a validity timer indicating a validity period of the system information and, in response to the end of the validity period, to obtain updated system information from the base station; the controller being responsive to a timer reset message received from the base station before the end of the validity period to alter the validity timer so as to increase a remaining portion of the validity period.

Figure 6:
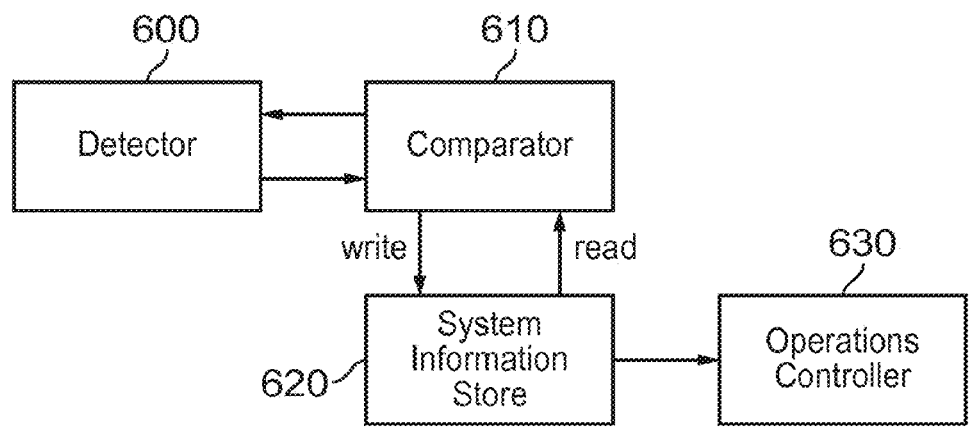
FIG. 6 is a schematic diagram showing a controller of a terminal device.

FIG. 6 is a schematic diagram showing a controller of a terminal device such as the controller 520 of FIG. 5.

As discussed above, the controller is connected so as to control operations of a transceiver (not shown in FIG. 6). The controller comprises a detector 600, a comparator 610, a system information store 620 and an operations controller 630. The detector 600 is arranged, in respect of a newly acquired (newly communicating) base station, to detect so-called system information transmitted (for example, broadcast, though in other examples at least part of the communication could be directed to a terminal device) by the base station. This is part of the arrangement by which the terminal device establishes communication with the base station. The system information provides various communications parameters which are needed by the terminal device for such communication.

The detector detects at a first stage a so-called Master Information Block (MIB). The MIB is the first piece of information which the terminal device acquires after it achieves downlink synchronisation with a base station. The MIB provides fundamental information which is needed for the terminal device to obtain other information relating to that base station.

The M1B is transmitted according to a fixed schedule having a periodicity of 40 ms, with multiple repetitions being made within the 40 ms period. In some examples, the MIB can change at the 40 ms period but is transmitted by the base station every 10 ms within that period. The MIB is detected first as it includes information relating to how the terminal device can receive the first of a set of system information blocks (SIBs), and in particular the MIB provides information as to how to receive a first system information block (SIB1). For example, it may refer to scheduling information for the broadcast of SIB1.

In turn, the system information block SIB1 contains cell access information as well as scheduling for other SIBs. The contents of the various system information blocks in example embodiments are given in the following discussion.

Master Information Block (MIB)

As mentioned above, this is the first piece of information which the terminal device seeks to download after establishing download synchronisation with a newly acquired (newly communicating) cell. It contains basic parameters defining the download channel and includes information required to receive SIB1.

SystemInformationBlockType1

This includes information relating to terminal device cell access and defines the schedule of other SIBs. It is therefore needed before the other SIBs can be obtained.

SystemInformationBlockType2

The SystemInformationBlockType2 contains radio resource configuration information that is common for all terminal devices.

SystemInformationBlockType3

The SystemInformationBlockType3 contains cell re-selection information common for intra-frequency, inter-frequency and/or inter-RAT cell re-selection.

SystemInformationBlockType4

The SystemInformationBlockType4 contains neighbouring cell related information relevant only for intra-frequency cell re-selection. The IE includes cells with specific re-selection parameters as well as blacklisted cells.

SystemInformationBlockType5

The SystemInformationBlockType5 contains information relevant only for inter-frequency cell re-selection i.e. information about other E-UTRA frequencies and inter-frequency neighbouring cells relevant for cell re-selection. The IE includes cell re-selection parameters common for a frequency as well as cell specific re-selection parameters.

Other SIBs

A similar concept can be applied to further SIBs. Those listed above are the essential ones for NB-IOT, but for v2x case there may be further SIBs (e.g. SIB6 for inter-RAT mobility)

In other words, in examples, the system information comprises a master information block, obtained by a terminal device before the terminal device obtains the system information blocks; the system information blocks comprise a succession of a first system information block and one or more further system information blocks; the master information block provides one or more parameters for reception of the first system information block; and the first system information block provides one or more parameters for reception of the one or more further system information blocks.

The system information received from a base station can define one or both of: (i) communication parameters for communication with that base station; and (ii) communication parameters for communicating with other terminal devices operating under the control of communication parameters received from that base station, in a device-to-device communication operation.

In examples, the system information data received from the base station can be system information data broadcast by the base station, for example using a mechanism described above in connection with FIG. 3.

So, in the absence of any re-usable stored system information, a normal operation of the detector 600 would be to detect first the MIB, then to use information from the MIB to detect SIB1, and then to use information from SIB1 to detect the remaining SIBs.

In example embodiments of the present disclosure, the MIB and/or SIB1 are associated with identification information which can be used to detect whether previously stored system information can be re-used for the newly communicating base station. For example, the MIB and/or SIB1 may contain the identification information (such as an area ID to be discussed below). Or the identification information may be identification information otherwise associated with the base station (such as a cell identifier or physical cell identifier (PCI)).

The comparator 610 compares identification information from the MIB or SIB1 with identification information applicable to system information stored in the system information store 620, If the comparison of identification information indicates that some or all of the system information stored in the system information store 620 can be used in connection with the newly communicating base station, then the comparator 610 instructs the detector 600 not to obtain those portions of the system information which are being re-used from the system information store. In some examples, a complete set of system information may be reusable from the system information store 620. In other examples, a subset of SIBs can be re-used. In other examples, parts of the contents of some SIBs can be re-used, and different information indicating changes to certain aspects of the SIBs being used from the system information store 620 is instead obtained by the detector 600.

At the end of the process, whether that process involves a detector 600 obtaining a complete set of new system information or some of the stored system information being re-used, the system information store 600 now contains a full set of system information applicable to the newly communicating base station. This system information is used by the operations controller 630 to control operations of the terminal device in connection with that base station.

Therefore, FIG. 6 (in conjunction with FIG. 5) provides an example of a terminal device for use in a wireless telecommunications system, the terminal device comprising: a transceiver (such as 500, 510) to perform wireless communication with a base station and (for example, 600) to obtain system information defining communication parameters from system information data received from that base station; system information storage (such as 620); and a controller (such as other functionality of 520 as shown in FIG. 6) to detect whether the system information storage already holds at least some of the system information applicable to the newly communicating base station and to control the transceiver to obtain any portions of the system information not already held by the terminal device.

In FIG. 6, the controller is configured to detect (610) whether identification data associated with system information received from the newly communicating base station corresponds to identification data associated with system information stored by the system information storage (620).

Figure 7:
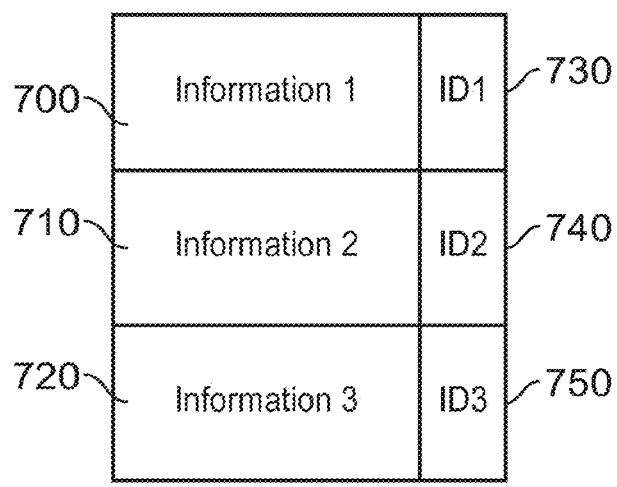
FIG. 7 schematically illustrates system information storage.

FIG. 7 schematically illustrates system information storage, for example by the system information store 620.

In some examples, the system information store 620 is arranged to store only one set of system information. This may be the system information from a most-recently-accessed base station and in some examples, such as those using an "area identifier", this can be applicable to the newly communicating base station. However, in other embodiments, the system information store 620 can store multiple sets of system information, and such an example is shown in FIG. 7. Here, each set 700, 710, 720 of system information has one or more identifiers 730, 740, 750 associated with it. The identifiers can be compared with identification information applicable to a newly communicating base station to detect whether some or all of the system information 700, 710, 720 can be re-used.

FIG. 7 therefore provides an example of the system information storage 620 being configured to store two or more instances of system information (700, 710, 720), each instance corresponding to one or more respective base stations. The instances can be, for example, two or more distinct instances of system information most recently obtained by the terminal device. One or more of the instances may represent a part but not all of the system information. An arrangement to handle this is discussed below with reference to FIG. 14, As discussed above, in examples, the system information comprises a plurality of system information blocks; and the controller is configured to detect whether the system information stored by the system information storage provides system information representing some or all of the system information blocks applicable to the newly communicating base station.

Figure 8:
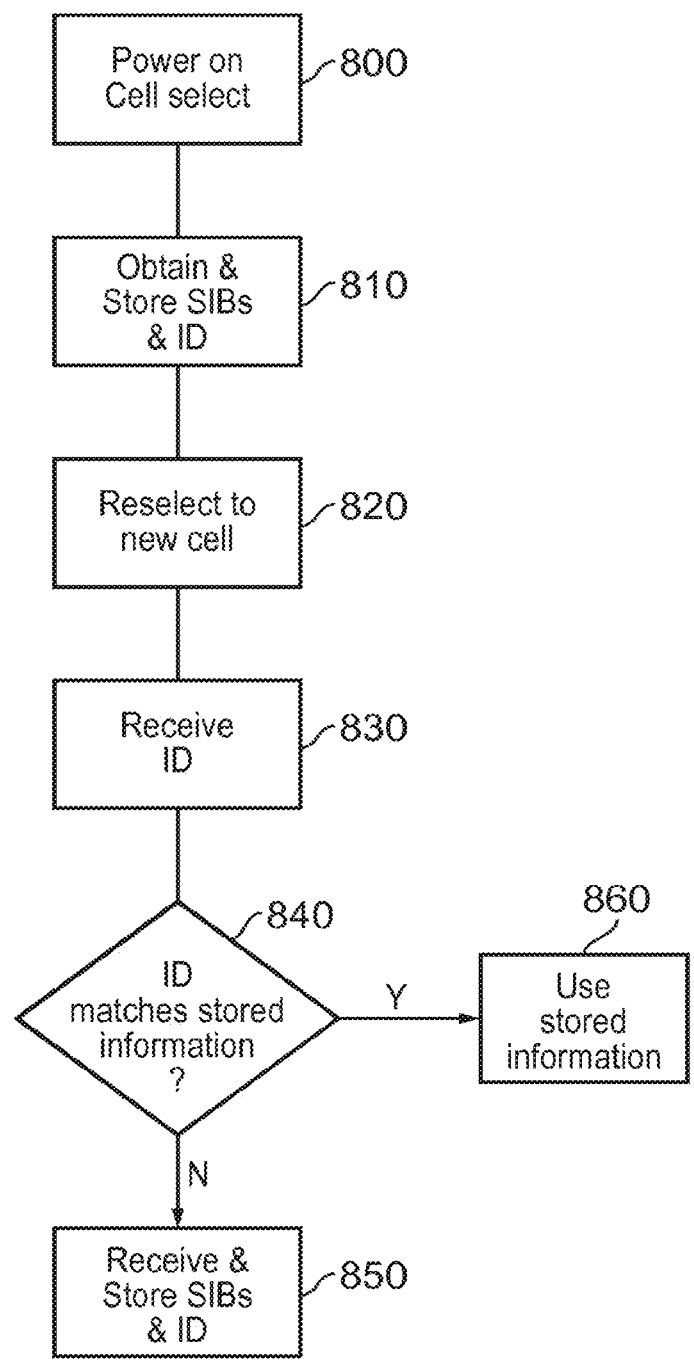
FIG. 8 is a schematic flowchart showing operations of a terminal device.

FIG. 8 is a schematic flow chart illustrating operations of a terminal device.

At a step 800, the device is powered on and selects a base station or cell. At a step 810, the terminal device obtains and stores the system information and an identifier for the selected base station. Operations then proceed involving communication with the selected cell.

Assume now that the terminal device is moved (its physical position changes) and, at a step 820 establishes communication with a new base station or cell. At a step 830, the terminal device receives the identifier information from the new cell (for example, as part of an MIB or SIB1 block). Then, at a step 840, the comparator 610 detects whether the received ID matches the ID associated with the stored system information obtained at the step 810. If the answer is yes, then at a step 860 the terminal device simply uses the stored information rather than obtaining a further set of system information from the base station. If the answer is no, then at a step 850 (similar to the step 810) the terminal device obtains and stores system information and the ID received at the step 830.

As discussed above, a hybrid of the steps 850, 860 can be used in instances where the stored information and ID indicate that some but not all of the stored system information may be re-used. For example, the controller can be configured to detect parts of a system information block stored by the system information storage which are applicable to the newly communicating base station and to obtain other parts of that system information block from the newly communicating base station. As an example, in response to reception of a first system information block carrying identification data which corresponds to system information stored by the system information store, the controller is configured to control the transceiver not to receive the further system information blocks.

In some examples, the system information store 620 is configured to store, as the identification data, a set of one or more base station identifiers applicable to at least respective portions of an instance of stored system information. For example, the identifiers could be so-called value tags or information block tags indicating a selection, amongst a set of possible information block content, so that if an already-stored information block has a particular information block tag, and SIB1 (for example) indicates the information block tags of the further SIBs still to be broadcast, the terminal device can elect not to attempt to receive any further information blocks for which the information block tag matches the information block stag of a corresponding stored information block. In other examples, the store 620 can store cell identifiers and/or public land mobile network identifiers and/or tracking area identifiers for which some or all of the stored information should be used. Accordingly, in examples, the identifiers can be cell identifiers; area identifiers; information block tags; tracking area identifiers; and/or public land mobile network identifiers, Note also that the procedure of the steps 800, 810 could be replaced by a process whereby the terminal device retains, between uses, the most recently obtained system information in, for example, a non-volatile memory, or the terminal device is pre-loaded with a set of system information.

Figure 9:
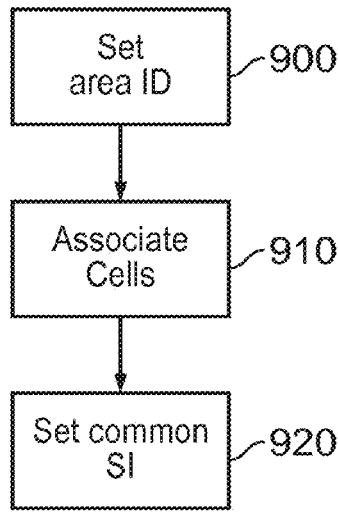
FIG. 9 is a schematic flowchart showing operations relating to base stations.

In some examples, geographically nearby base stations have in common at least some of their system information, so that if a terminal device moves from one such base station to another, there is either no need to obtain the system information again or there is a reduced need to obtain system information. One way in which this can be achieved is by the use of a so-called area identifier (area ID). The area ID can be transmitted by the base station as part of the MIB, as part of SIB1, as part of another small SIB transmitted before the transmission of SIB1, and so on. An example of this type of arrangement is illustrated in FIG. 9 in which operations relating to a group or cohort of base stations are shown. These operations can include: at a step 900, setting an area ID; at a step 910, associating cells or base stations (such as a group of geographically closely located base stations) with the area ID; and at a step 920, establishing a common set of system information, either all of the system information or selected portions of the system information, which is common to all base stations associated with that area ID. The common set of system information can be passed to each base station sharing the area ID via control channels of the core network 102 at system configuration.

The effect of the step 920 is that each of the base stations having that area ID operates according to communication parameters defined by the common system information. Also, as discussed above, the area ID is transmitted by the base stations in one of the existing blocks or as a separate SIB such as an SIB transmitted before SIB1.

In the context of the cohort or set of base stations shown in FIG. 1, where the arrangement of FIG. 9 applies this provides an example of a set of two or more base stations, in which the identification data (such as the area ID) and at least part of the system information are common between the set of two or more base stations.

The arrangement of FIG. 9 can be used in the case where all of the base stations sharing the area ID have all of their system information in common. In another example, a common, core, set of system information is defined (for example amongst base stations sharing an area ID), with the potential for individual base stations to broadcast differences with respect to the common core system information. As an example of a technique to achieve this, FIG. 10 shows steps carried out by a terminal device and FIG. 11 shows steps carried out by a base station.

Figure 10:
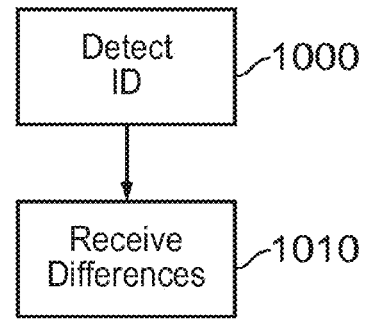
FIG. 10 is a schematic flowchart illustrating operations of a terminal device.

FIG. 10 assumes that the terminal device already stores the common core set of system information, either as an earlier download or as pre-loaded information. If it does not, then at a first operation (not shown in FIG. 10 but similar to the steps 800, 810 of FIG. 8) the common core system information is obtained from broadcast information the first base station accessed. Then, at a step 1000, the terminal device detects the area ID of an individual base station and receives difference data at a step 1010 defining differences between the common core system information defined in respect of that area ID and the particular system information corresponding to that base station.

Figure 11:
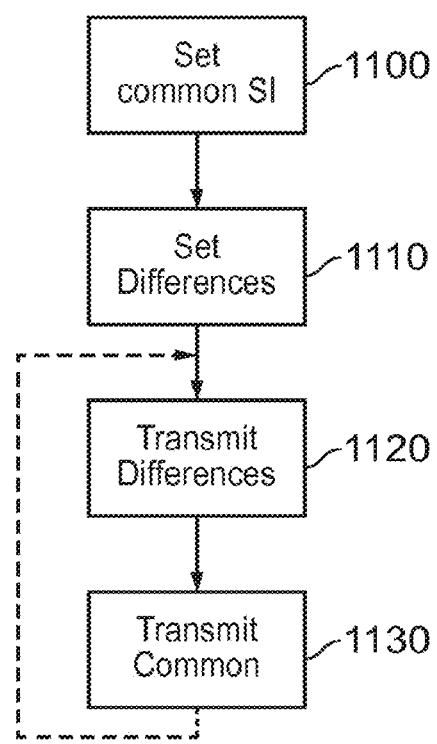
FIG. 11 is a schematic flowchart illustrating operations of a base station.

In FIG. 11, at a step 1100 a common core set of system information is defined as discussed above, with application to multiple base stations. An individual base station defines any differences with respect to the common system information at a step 1110. Then, on a repetitive or cyclic basis, the individual base station transmits difference data at a step 1120 and, from time to time, a full set of the common system information at a step 1130. This is an example of a base station in which the controller is configured to control the transceiver to transmit (i) a complete instance of the system information; and (ii) a partial instance of the system information containing difference information with respect to an instance of system information applicable to another base station.

Figure 12:
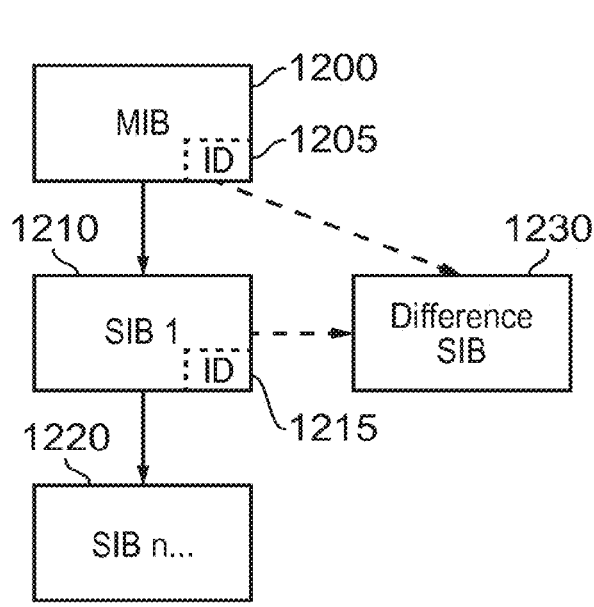
FIG. 12 schematically illustrates a system information data structure.

FIG. 12 schematically illustrates a system information data structure applicable to the arrangement of FIGS. 10 and 11, in which an MIB 1200 contains a pointer to SIB1 1210 which in turn contains a pointer to subsequent SIBs 1220. Area ID information is provided in the MIB (1205) and/or in the SIB1 (1215). At least some of the SIBs (such as the subsequent SIBs 1220) are considered as the common core system information which is downloaded by a terminal device which does not currently hold a copy of that information. However, for a terminal device which does hold a copy of the common core information, the MIB and/or the SIB1 blocks provide reception information indicating how to receive one or more difference SIBs 1230 (defining differences, if any, from the core information) which are received by the terminal device at the step 1010 of FIG. 10.

The arrangement of FIG. 12, when transmitted by a base station (for example using a format as shown in FIG. 3) provides an example of a wireless data signal transmitted by a base station, the wireless data signal comprising system information defining communication parameters and identification data (such as 1205, 1215) indicating a group of two or more base stations having at least part of the system information in common.

For example, the identification data (such as Area ID) many be carried by one or both of the master information block and the first system information block.

Embodiments of the disclosure provide other similar examples of a wireless data signal transmitted by a base station, the wireless data signal comprising system information blocks defining communication parameters and identification data indicating a group of two or more base stations having at least part of the system information in common, the system information blocks including (i) a complete instance of a system information block; and (ii) a partial instance of the system information block containing difference information with respect to an instance of system information applicable to another base station; and as another example a wireless data signal transmitted by a base station, the wireless data signal comprising system information blocks defining communication parameters and, from time to time, a timer reset message to instruct a terminal device to increase a remaining portion of a validity period maintained by that base station for system information held by that base station.

Figure 13:
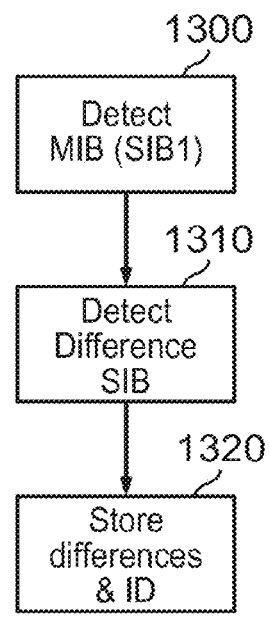
FIG. 13 is a schematic flowchart illustrating operations of a terminal device.

FIG. 13 is a schematic flow chart illustrating operations of a terminal device under the arrangement of FIG. 12, in which at a step 1300 the terminal device detects the MIB and/or SIB1, and based on information contained in those blocks, at a step 1310 detects the difference SIB 1230. At a step 1320 the terminal device stores the differences along with the area ID.

Figure 14:
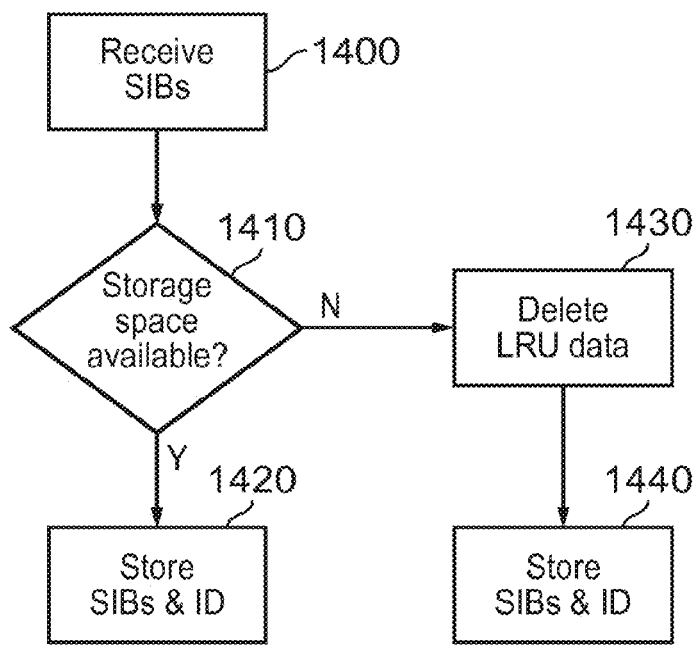
FIG. 14 is a schematic flowchart illustrating operations of a terminal device.

FIG. 14 is a schematic flow chart illustrating operations of a terminal device in order to manage the storage provided by the system information store 620.

At a step 1400 the terminal device receives system information blocks relating to system information which is not currently held in the system information store 620. At a step 1410, the terminal device detects whether storage space is available in the system information store 620 to store the newly receives system information. If the answer is yes then the newly received system information and associated ID information is stored at a step 1420. If, however, the answer is no then at a step 1430 the least recently used (LRU) system information data in the system information store 620 is deleted, and a step 1440 the newly received system information is stored along with its ID.

FIG. 15 is a flowchart providing a summary of a method of operation of a terminal device for use in a wireless telecommunications system and having a transceiver to perform wireless communication with a base station and to obtain system information defining communication parameters from system information data received from that base station and system information storage; the method comprising:

detecting (at a step 1500) whether the system information storage already holds at least some of the system information applicable to the newly communicating base station; and controlling (at a step 1510) the transceiver to obtain any portions of the system information not already held by the terminal device.

FIG. 16 is a flowchart providing a summary of a method of operation of a base station for use in a wireless telecommunications system and having a transceiver to perform wireless communication with a terminal device; the method comprising:

controlling (at a step 1600) the transceiver to transmit system information defining communication parameters and identification data indicating a group of two or more base stations having at least part of the system information in common.

FIG. 17 is a flowchart providing a summary of a method of operation of a base station for use in a wireless telecommunications system and having a transceiver to perform wireless communication with a terminal device; the method comprising:

controlling, at a step 1700, the transceiver to transmit reference data referencing a set of system information defining communication parameters of that base station; and controlling, at a step 1710, the transceiver to conduct wireless communication in accordance with the referenced system information.

Further respective examples of operations of the base station of FIG. 4 and/or the terminal device of FIG. 5 will now be described. As an example, the operations can be carried out by the respective controller 420, 520, for example (though not necessarily) under software, firmware or other program control.

FIG. 18 is a summary flowchart of a method of operation of a terminal device for use in a wireless telecommunications system, the method comprising:

obtaining (at a step 1800) system information defining communication parameters from system information data received from a base station, the system information comprising a plurality of system information blocks;

storing (at a step 1810) the system information;

detecting (at a step 1820) whether the system information storage already holds at least some of the system information applicable to a newly communicating base station;

obtaining (at a step 1830) any portions of the system information not already stored by detecting parts of a stored system information block which are applicable to the newly communicating base station; and obtaining (at a step 1840) other parts of that system information block as a partial system information block (such as the difference SIB 1230 discussed above) from the newly communicating base station.

This arrangement relates to the techniques discussed above with reference to FIGS. 12 and 13, in which one or more partial information blocks are obtained from the base station. The content of the partial information blocks are then used (for example, at the step 1320 discussed above) to replace or supplement the information already stored.

FIG. 19 is a summary flowchart of a method of operation of a terminal device for use in a wireless telecommunications system, the method comprising:

obtaining (at a step 1900) system information defining communication parameters from system information data comprising a plurality of information blocks;

storing (at a step 1910) the system information;

detecting (at a step 1920) whether the system information storage already holds at least some of the system information applicable to a newly communicating base station;

obtaining (at a step 1930) any portions of the system information from the newly communicating base station which are not already stored; and detecting (at a step 1940) whether identification data associated with information blocks transmitted by the newly communicating base station corresponds to identification data associated with stored information blocks;

in which the identification data comprises area information identifying a group of base stations and a value tag identifying a version of one or more of the information blocks.

In this example, an information block tag or value tag is associated with each MIB and SIB and stored in the store 620 along with the corresponding MIB or SIB. The area ID indicates the area of validity (as a group of base stations) of the value tag. The value tag can, in some examples, indicate a version number or reference of the corresponding block. On moving to a new base station, the controller of a terminal device compares the value tags and area ID of its stored MIB and SIBs with those of the corresponding blocks being provided by the new base station and obtains only those blocks not having a match of both the area ID and value tag.

For example, the group of base stations identified by the area information identifies those base stations to which the value tag is applicable.

In examples, a respective value tag is associated with each of the master information block, the first system information block and the further system information blocks.

FIG. 20 is a summary flowchart of a method of operation of a terminal device for use in a wireless telecommunications system, the method comprising:

obtaining (at a step 2000) system information defining communication parameters from system information data transmitted by a base station;

storing (at a step 2010) the system information and one or more associated value tags identifying a version of respective portions of the system information; and detecting (at a step 2020) whether the system information storage already holds at least some of the system information applicable to the newly communicating base station;

obtaining (at a step 2030) any portions of the system information not already held by the terminal device from the base station;

detecting (at a step 2040) an instruction to obtain updated system information; and in response to detection of the instruction, obtaining (at a step 2050) from the base station an updated version of only those portions of the system information having a value tag indicating a version of those portions different to the corresponding stored value tag.

Here, the controller of the terminal device can use the value tag information associated with stored MIB or SIBs so as to re-use any MIB or SIBs previously acquired which have a value tag (optionally, and an area ID as discussed above) which matches those of the corresponding blocks being provided by the newly communicating base station. In examples, the value tag may indicate a version number or reference of the corresponding block.

In examples, the instruction is a paging instruction received from the base station.

In examples, the instruction is included in the master information block or the first system information block.

In examples, the controller is configured to maintain a validity timer indicating a validity period of the system information, the instruction being detected in response to the end of the validity period. For example, the controller can be responsive to a timer reset message received from the base station before the end of the validity period to alter the validity timer so as to increase a remaining portion of the validity period. In examples, the controller is responsive to the timer reset message to reset the validity timer to indicate that full validity period is remaining. In examples, the timer reset message is a paging message received from the base station.

FIG. 21 is a summary flowchart of a method of operation of a terminal device for use in a wireless telecommunications system, the method comprising:

obtaining (at a step 2100) system information defining communication parameters from system information data transmitted by a base station;

storing (at a step 2110) the system information;

detecting (at a step 2120) whether the system information storage already holds at least some of the system information applicable to the newly communicating base station;

obtaining (at a step 2130) any portions of the system information not already stored by the terminal device from the base station;

maintaining (at a step 2140) a validity timer indicating a validity period of the system information;

in response to the end of the validity period, obtaining (at a step 2150) updated system information from the base station; and in response to a timer reset message received from the base station before the end of the validity period, altering (at a step 2160) the validity timer so as to increase a remaining portion of the validity period.

In this example, the terminal device maintains (for example, using the controller) a timer indicating a time towards a validity period for system information. An example of a validity period is three hours. When the end of the validity period is reached, the terminal device obtains replacement system information from the base station. For a low power device this could be unnecessary and/or inappropriate, especially if the blocks have not actually changed. This technique therefore allows the base station to send a message or instruction to the terminal device that there is no need to update its system information.

In examples, in the altering step the timer reset message resets the validity timer to indicate that full validity period is remaining.

In examples, the timer reset message is a paging message received from the base station.

In examples, the timer reset message is included in a first system information message received from the base station and the alteration to the validity timer applies to one or more further system information messages.

In other examples, the controller is configured to infer the timer reset message from a first system information message received from the base station for which the controller detects whether the system information storage already holds system information corresponding to that message, and the alteration to the validity timer applies to one or more further system information messages.

FIG. 22 is a summary flowchart of a method of operation of a base station for use in a wireless telecommunications system, the method comprising:

performing (at a step 2200) wireless communication with a terminal device; and transmitting (at a step 2210) system information defining communication parameters and identification data indicating a group of two or more base stations having at least part of the system information in common, in which the system information comprises a plurality of system information blocks, by transmitting (i) a complete instance of a system information block; and (ii) a partial instance of the system information block containing difference information with respect to an instance of system information applicable to another base station.

FIG. 23 is a summary flowchart of a method of operation of a base station for use in a wireless telecommunications system, the method comprising:

performing (at a step 2300) wireless communication with a terminal device; and transmitting (at a step 2310) system information defining communication parameters, in which the system information comprises a plurality of system information blocks; and transmitting (at a step 2320) a timer reset message to instruct a terminal device to increase a remaining portion of a validity period maintained by that base station for system information held by that base station.

FIG. 24 is a summary flowchart of a method of operation of a base station for use in a wireless telecommunications system, the method comprising:

transmitting (at a step 2400) reference data referencing a set of system information defining communication parameters of that base station; and performing (at a step 2410) wireless communication with a terminal device in accordance with the referenced system information.

Finally, although the foregoing has described the terminal device as particular examples, any type of device is envisaged. For example, according to present principles, the device may be a wearable device such as smart glasses, or a fitness band. Further, the device may be located in a vehicle such as a car or van or a boat, or it may be a stationary device such as a smart meter, sensor or home appliance.

Where methods of processing, transmitting or receiving are discussed above, it will be appreciated that apparatus configured to perform such methods are also considered to represent embodiments of the disclosure.

In so far as embodiments of the disclosure have been described as being (or are technically capable of being) implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein, Embodiments of the present disclosure can be exemplified by the following numbered paragraphs.

1. A terminal device for use in a wireless telecommunications system, the terminal device comprising:
    a transceiver to perform wireless communication with a base station and to obtain system information defining communication parameters from system information data received from that base station;
    system information storage; and
    a controller to detect whether the system information storage already holds at least some of the system information applicable to a newly communicating base station and to control the transceiver to obtain any portions of the system information not already held by the terminal device, in which:
    the system information comprises a plurality of system information blocks; and
    the controller is configured to detect parts of a system information block stored by the system information storage which are applicable to the newly communicating base station and to obtain other parts of that system information block as a partial system information block from the newly communicating base station.
2. A terminal device according to clause 1, in which the controller is configured to detect whether identification data associated with system information received from the newly communicating base station corresponds to identification data associated with system information stored by the system information storage.
3. A terminal device according to clause 1 or clause 2, in which the system information storage is configured to store two or more instances of system information, each instance corresponding to one or more respective base stations.
4. A terminal device according to clause 3, in which the system information storage is configured to store two or more distinct instances of system information most recently obtained by the terminal device.
5. A terminal device according to any one of the preceding clauses, in which:
    the system information comprises a master information block, obtained by a terminal device before the terminal device obtains the system information blocks;
    the system information blocks comprise a succession of a first system information block and one or more further system information blocks;

the master information block provides one or more parameters for reception of the first system information block; and the first system information block provides one or more parameters for reception of the one or more further system information blocks.

6. A terminal device according to clause 5, in which the identification data is carried by one or both of the master information block and the first system information block.

7. A terminal device according to clause 5 or clause 6, in which, in response to reception of a first system information block carrying identification data which corresponds to system information stored by the system information store, the controller is configured to control the transceiver not to receive the further system information blocks.

8. A terminal device according to any one of clauses 2 to 7, in which the system information storage is configured to store, as the identification data, a set of one of more base station identifiers applicable to at least respective portions of an instance of stored system information.

9. A terminal device according to clause 8, in which the base station identifiers comprise one or more selected from the list consisting of:
cell identifier;
area identifier;
information block tag;
tracking area identifier; and
public land mobile network identifier.

10. A terminal device according to any one of the preceding clauses, in which the system information received from a base station defines one or both of:
communication parameters for communication with that base station; and
communication parameters for communicating with other terminal devices operating under the control of communication parameters received from that base station, in a device-to-device communication operation.

11. A terminal device according to any one of the preceding clauses, in which the system information data received from the base station is system information data broadcast by the base station.

12. A terminal device for use in a wireless telecommunications system, the terminal device comprising:
a transceiver to perform wireless communication with a base station and to obtain system information defining communication parameters from system information data comprising a plurality of information blocks;
system information storage; and
a controller to detect whether the system information storage already holds at least some of the system information applicable to the newly communicating base station and to control the transceiver to obtain any portions of the system information from the newly communicating base station which are not already held by the terminal device;
in which the controller is configured to detect whether identification data associated with information blocks transmitted by the newly communicating base station corresponds to identification data associated with information blocks stored by the system information storage;
in which the identification data comprises area information identifying a group of base stations and a value tag identifying a version of one or more of the information blocks.

13. A terminal device according to clause 12, in which the group of base stations identified by the area information identifies those base stations to which the value tag is applicable.

14. A terminal device according to clause 12 or clause 13, in which:
the system information comprises a master information block, obtained by a terminal device before the terminal device obtains the system information blocks;
the system information blocks comprise a succession of a first system information block and one or more further system information blocks;
the master information block provides one or more parameters for reception of the first system information block; and
the first system information block provides one or more parameters for reception of the one or more further system information blocks.

15. A terminal device according to clause 14, in which a respective value tag is associated with each of the master information block, the first system information block and the further system information blocks.

16. A terminal device for use in a wireless elecommunications system, the terminal device comprising:
a transceiver to perform wireless communication with a base station and to obtain system information defining communication parameters from system information data transmitted by that base station;
system information storage configured to store the system information and one or more associated value tags identifying a version of respective portions of the system information; and
a controller to detect whether the system information storage already holds at least some of the system information applicable to the newly communicating base station and to control the transceiver to obtain any portions of the system information not already held by the terminal device from the base station;
the controller being configured to detect an instruction to obtain updated system information and, in response to detection of the instruction, to obtain from the base station an updated version of only those portions of the system information having a value tag indicating a version of those portions different to the corresponding value tag held by the system information storage.

17. A terminal device according to clause 16, in which the instruction is a paging instruction received from the base station.

18. A terminal device according to clause 16 or clause 17, in which:
the system information comprises a master information block, obtained by a terminal device before the terminal device obtains the system information blocks;
the system information blocks comprise a succession of a first system information block and one or more further system information blocks;
the master information block provides one or more parameters for reception of the first system information block; and
the first system information block provides one or more parameters for reception of the one or more further system information blocks.

19. A terminal device according to clause 18, in which the instruction is included in the master information block or the first system information block.

20. A terminal device according to any one of clauses 16 to 19, in which the controller is configured to maintain a validity timer indicating a validity period of the system information, the instruction being detected in response to the end of the validity period.
21. A terminal device according to clause 20, in which the controller is responsive to a timer reset message received from the base station before the end of the validity period to alter the validity timer so as to increase a remaining portion of the validity period.
22. A terminal device according to clause 21, in which the controller is responsive to the timer reset message to reset the validity timer to indicate that full validity period is remaining.
23. A terminal device according to clause 22, in which the timer reset message is a paging message received from the base station.
24. A terminal device for use in a wireless telecommunications system, the terminal device comprising:
a transceiver to perform wireless communication with a base station and to obtain system information defining communication parameters from system information data transmitted by that base station;
system information storage; and
a controller to detect whether the system information storage already holds at least some of the system information applicable to the newly communicating base station and to control the transceiver to obtain any portions of the system information not already held by the terminal device from the base station;
the controller being configured to maintain a validity timer indicating a validity period of the system information and, in response to the end of the validity period, to obtain updated system information from the base station;
the controller being responsive to a timer reset message received from the base station before the end of the validity period to alter the validity timer so as to increase a remaining portion of the validity period.
25. A terminal device according to clause 24, in which the controller is responsive to the timer reset message to reset the validity timer to indicate that full validity period is remaining.
26. A terminal device according to clause 24 or clause 25, in which the timer reset message is a paging message received from the base station.
27. A terminal device according to any one of clauses 24 to 26, in which the timer reset message is included in a first system information message received from the base station and the alteration to the validity timer applies to one or more further system information messages.
28. A terminal device according to any one of clauses 24 to 26, in which the controller is configured to infer the timer reset message from a first system information message received from the base station for which the controller detects whether the system information storage already holds system information corresponding to that message, and the alteration to the validity timer applies to one or more further system information messages.
29. A base station for use in a wireless telecommunications system, the base station comprising:
a transceiver to perform wireless communication with a terminal device; and
a controller to control the transceiver to transmit system information defining communication parameters and identification data indicating a group of two or more base stations having at least part of the system information in common; in which:
the system information comprises a plurality of system information blocks;

the controller is configured to control the transceiver to transmit (i) a complete instance of a system information block; and (ii) a partial instance of the system information block containing difference information with respect to an instance of system information applicable to another base station.
30. A base station according to clause 29, in which:
the system information comprises a master information block and two or more system information blocks;
the system information blocks comprise a succession of a first system information block and one or more further system information blocks;
the master information block provides one or more parameters for reception, by a terminal device, of the first system information block; and
the first system information block provides one or more parameters for reception, by a terminal device, of the one or more further system information blocks.
31. A base station according to clause 30, in which the controller is configured to control the transceiver to transmit the identification data in one or both of the master information block and the first system information block.
32. A base station according to any one of clauses 29 to 31, in which the controller is configured to control the transceiver to broadcast the system information.
33. A set of two or more base stations each according to any one of clauses 29 to 32, in which the identification data and at least part of the system information are common between the set of two or more base stations.
34. A base station for use in a wireless telecommunications system, the base station comprising:
a transceiver to perform wireless communication with a terminal device; and
a controller to control the transceiver to transmit system information defining communication parameters; in which:
the system information comprises a plurality of system information blocks;
the controller is configured to control the transceiver to transmit a timer reset message to instruct a terminal device to increase a remaining portion of a validity period maintained by that base station for system information held by that base station.
35. A base station for use in a wireless telecommunications system, the base station comprising:
a transceiver to perform wireless communication with a terminal device; and
a controller to control the transceiver to transmit reference data referencing a set of system information defining communication parameters of that base station;
the controller being configured to control the transceiver to conduct wireless communication in accordance with the referenced system information.
36. A wireless data signal transmitted by a base station, the wireless data signal comprising system information blocks defining communication parameters and identification data indicating a group of two or more base stations having at least part of the system information in common, the system information blocks including (i) a complete instance of a system information block; and (ii) a partial instance of the system information block containing difference information with respect to an instance of system information applicable to another base station.
37. A wireless data signal transmitted by a base station, the wireless data signal comprising system information blocks defining communication parameters and, from time to time, a timer reset message to instruct a terminal device to increase a remaining portion of a validity period maintained by that base station for system information held by that base station.

38. A method of operation of a terminal device for use in a wireless telecommunications system, the method comprising:

obtaining system information defining communication parameters from system information data received from a base station, the system information comprising a plurality of system information blocks;

storing the system information;

detecting whether the system information storage already holds at least some of the system information applicable to a newly communicating base station; and obtaining any portions of the system information not already stored by detecting parts of a stored system information block which are applicable to the newly communicating base station and obtaining other parts of that system information block as a partial system information block from the newly communicating base station.

39. Computer software which, when executed by a computer, causes the computer to perform the method of clause 38.

40. A machine-readable non-transitory storage medium which stores computer software according to clause 39.

41. A method of operation of a terminal device for use in a wireless telecommunications system, the method comprising:

obtaining system information defining communication parameters from system information data comprising a plurality of information blocks;

storing the system information;

detecting whether the system information storage already holds at least some of the system information applicable to a newly communicating base station;

obtaining any portions of the system information from the newly communicating base station which are not already stored; and detecting whether identification data associated with information blocks transmitted by the newly communicating base station corresponds to identification data associated with stored information blocks;

in which the identification data comprises area information identifying a group of base stations and a value tag identifying a version of one or more of the information blocks.

42. Computer software which, when executed by a computer, causes the computer to perform the method of clause 41.

43. A machine-readable non-transitory storage medium which stores computer software according to clause 42.

44. A method of operation of a terminal device for use in a wireless telecommunications system, the method comprising:

obtaining system information defining communication parameters from system information data transmitted by a base station;

storing the system information and one or more associated value tags identifying a version of respective portions of the system information; and detecting whether the system information storage already holds at least some of the system information applicable to the newly communicating base station;

obtaining any portions of the system information not already held by the terminal device from the base station;

detecting an instruction to obtain updated system information; and in response to detection of the instruction, obtaining from the base station an updated version of only those portions of the system information having a value tag indicating a version of those portions different to the corresponding stored value tag.

45. Computer software which, when executed by a computer, causes the computer to perform the method of clause 44.

46. A machine-readable non-transitory storage medium which stores computer software according to clause 45.

47. A method of operation of a terminal device for use in a wireless telecommunications system, the method comprising:

obtaining system information defining communication parameters from system information data transmitted by a base station;

storing the system information;

detecting whether the system information storage already holds at least some of the system information applicable to the newly communicating base station;

obtaining any portions of the system information not already stored by the terminal device from the base station;

maintaining a validity timer indicating a validity period of the system information;

in response to the end of the validity period, obtaining updated system information from the base station; and in response to a timer reset message received from the base station before the end of the validity period, altering the validity timer so as to increase a remaining portion of the validity period.

48. Computer software which, when executed by a computer, causes the computer to perform the method of clause 47.

49. A machine-readable non-transitory storage medium which stores computer software according to clause 48.

50. A method of operation of a base station for use in a wireless telecommunications system, the method comprising:

performing wireless communication with a terminal device; and transmitting system information defining communication parameters and identification data indicating a group of two or more base stations having at least part of the system information in common, in which the system information comprises a plurality of system information blocks, by transmitting (i) a complete instance of a system information block; and (ii) a partial instance of the system information block containing difference information with respect to an instance of system information applicable to another base station.

51. Computer software which, when executed by a computer, causes the computer to perform the method of clause 50.

52. A machine-readable non-transitory storage medium which stores computer software according to clause 51.

53. A method of operation of a base station for use in a wireless telecommunications system, the method comprising:

performing wireless communication with a terminal device; and transmitting system information defining communication parameters, in which the system information comprises a plurality of system information blocks; and transmitting a timer reset message to instruct a terminal device to increase a remaining portion of a validity period maintained by that base station for system information held by that base station.

54. Computer software which, when executed by a computer, causes the computer to perform the method of clause 53.
55. A machine-readable non-transitory storage medium which stores computer software according to clause 54.
56. A method of operation of a base station for use in a wireless telecommunications system, the method comprising:
transmitting reference data referencing a set of system information defining communication parameters of that base station; and
performing wireless communication with a terminal device in accordance with the referenced system information.
57. Computer software which, when executed by a computer, causes the computer to perform the method of clause 56.
58. A machine-readable non-transitory storage medium which stores computer software according to clause 57.

The invention claimed is:
1. A base station for use in a wireless telecommunications system, the base station comprising:
a transceiver to perform wireless communication with a terminal device; and
a controller to control the transceiver to transmit system information defining communication parameters and identification data indicating a group of two or more base stations having at least part of the system information in common, wherein
the system information comprises a plurality of system information blocks,
the controller is configured to control the transceiver to transmit (i) a complete instance of a system information block; and (ii) a partial instance of the system information block containing difference information with respect to an instance of system information applicable to another base station,
the system information comprises a master information block and a succession of a first system information block and one or more further system information blocks, and
the master information block provides one or more parameters for reception, by a terminal device, of the first system information block, and the first system information block provides one or more parameters for reception, by a terminal device, of the one or more further system information blocks.
2. The base station of claim 1, wherein the controller is configured to control the transceiver to transmit the identification data in one or both of the master information block and the first system information block.
3. The base station of claim 1, wherein the controller is configured to control the transceiver to broadcast the system information.
4. The base station of claim 1, wherein the identification data comprises at least one of:
cell identifier;
area identifier;
information block tag;
tracking area identifier; and
public land mobile network identifier.
5. The base station of claim 1, wherein
the system information defines communication parameters for the terminal device to communicate with the base station.
6. The base station of claim 1, wherein
the system information defines communication parameters for the terminal device to connect with another terminal device operating under the communication parameters transmitted from the base station in a device-to-device communication operation.
7. The base station of claim 1, wherein
the identification data includes a value tag identifying a version of the plurality of system information blocks.
8. A method of operation of a terminal device for use in a wireless telecommunications system, the method comprising:
obtaining system information defining communication parameters from system information data received from a base station, the system information comprising a plurality of system information blocks;
storing the system information;
detecting whether the system information storage already holds at least some of the system information applicable to a newly communicating base station; and
obtaining any portions of the system information not already stored by detecting parts of a stored system information block which are applicable to the newly communicating base station and obtaining other parts of that system information block as a partial system information block from the newly communicating base station, wherein
the system information comprises a master information block and a succession of a first system information block and one or more further system information blocks, and
the master information block provides one or more parameters for reception of the first system information block, and the first system information block provides one or more parameters for reception of the one or more further system information blocks.
9. The method of claim 8, wherein
the master information block is obtained by the terminal device before the terminal device obtains the system information blocks.
10. The method of claim 8, further comprising:
determining whether identification data associated with system information received from the newly communicating base station corresponds to identification data associated with system information stored by the memory.
11. The method of claim 8, further comprising:
storing two or more instances of system information, each instance corresponding to one or more respective base stations.
12. The method of claim 8, further comprising:
storing two or more distinct instances of system information most recently obtained by the terminal device.
13. The method of claim 8, wherein
the identification data is carried by one or both of the master information block and the one system information block.
14. The method of claim 8, further comprising:
in response to reception of a first system information block carrying identification data which corresponds to system information stored by the memory, not processing the further system information blocks.
15. A method of operation of a base station for use in a wireless telecommunications system, the method comprising:
performing wireless communication with a terminal device; and transmitting system information defining communication parameters and identification data indicating a group of two or more base stations having at least part of the system information in common, wherein the system information comprises a plurality of system information blocks, by transmitting (i) a complete instance of a system information block; and (ii) a partial instance of the system information block containing difference information with respect to an instance of system information applicable to another base station, wherein the system information comprises a master information block and a succession of a first system information block and one or more further system information blocks, and the master information block provides one or more parameters for reception, by a terminal device, of the first system information block, which provides one or more parameters for reception, by a terminal device, of the one or more further system information blocks.

* * * * *